United States Patent
We et al.

(10) Patent No.: US 12,211,474 B2
(45) Date of Patent: Jan. 28, 2025

(54) WHEEL FOR REDUCING RESONANCE NOISE IN VEHICLE

(71) Applicants: Hyundai Motor Company, Seoul (KR); Kia Corporation, Seoul (KR); Hyundai Sungwoo Casting Co., Ltd., Seoul (KR)

(72) Inventors: Young Jin We, Seongnam-si (KR); Ji Hoon Jeong, Hwaseong-si (KR); Jong Ju Lee, Chungju-si (KR); Da Woon Lim, Chungju-si (KR); Seong Hun Choi, Chungju-si (KR); Sang Bum Park, Chungju-si (KR); Young Il Kim, Chungju-si (KR)

(73) Assignees: Hyundai Motor Company, Seoul (KR); Kia Corporation, Seoul (KR); Hyundai Sungwoo Casting Co., Ltd., Seoul (KR)

( * ) Notice: Subject to any disclaimer, the term of this patent is extended or adjusted under 35 U.S.C. 154(b) by 394 days.

(21) Appl. No.: 17/679,953

(22) Filed: Feb. 24, 2022

(65) Prior Publication Data
US 2022/0351710 A1    Nov. 3, 2022

(30) Foreign Application Priority Data
Apr. 30, 2021    (KR) .................. 10-2021-0056343

(51) Int. Cl.
*G10K 11/172* (2006.01)
*B60B 21/12* (2006.01)

(52) U.S. Cl.
CPC ............ *G10K 11/172* (2013.01); *B60B 21/12* (2013.01); *B60B 2900/133* (2013.01)

(58) Field of Classification Search
CPC ............................. G10K 11/172; B60B 21/12
See application file for complete search history.

(56) References Cited

U.S. PATENT DOCUMENTS

| | | | |
|---|---|---|---|
| 6,435,303 B1 * | 8/2002 | Warnaka | E04B 1/86 |
| | | | 181/286 |
| 9,694,626 B2 * | 7/2017 | Kamiyama | B60B 21/025 |
| 10,504,500 B2 * | 12/2019 | Kamiyama | G10K 11/172 |
| 11,869,473 B2 * | 1/2024 | Honji | G10K 11/172 |
| 2022/0189447 A1 * | 6/2022 | Furumori | B60B 21/02 |

FOREIGN PATENT DOCUMENTS

| KR | 10-2018-0070123 A | 6/2018 |
|---|---|---|
| KR | 10-2020-0118269 A | 10/2020 |

* cited by examiner

*Primary Examiner* — Jason R Bellinger
(74) *Attorney, Agent, or Firm* — Morgan, Lewis & Bockius LLP

(57) ABSTRACT

A wheel for reducing a resonance noise in a vehicle may include a cylindrical-shaped rim on which a tire is mounted, and waveguides mounted on the rim, disposed in a cavity which is a space between the rim and the tire, having a 'U'-shaped internal passage through which a sound wave generated in the cavity enters, and configured to reflect the sound wave entering the internal passage to generate a sound wave having an inverse phase, wherein a center portion of the internal passage extends in an axial direction of the rim, and first and second end portions of the internal passage are connected to a center portion of the internal passage to allow the sound wave to propagate and extend in a circumferential direction of the rim.

12 Claims, 5 Drawing Sheets

[ A-A SECTION ]

WHEEL FOR REDUCING RESONANCE NOISE IN VEHICLE

CROSS-REFERENCE TO RELATED APPLICATION

The present application claims priority to Korean Patent Application No. 10-2021-0056343 filed on Apr. 30, 2021, the entire contents of which is incorporated herein for all purposes by this reference.

BACKGROUND OF THE INVENTION

Field of the Invention

The present invention relates to a wheel for a vehicle, and more particularly, to a wheel for reducing a resonance noise to increase an effect of reducing the resonance noise of the wheel.

Description of Related Art

A wheel for a vehicle is provided with a tire and thus a cavity is formed between the wheel and the tire. The cavity has an inherent resonance frequency according to its circumferential length.

The tire mounted on the wheel for a vehicle is in constant friction with a road surface while driving. When the cavity is oscillated due to a contact between the tire and the road surface, a sound wave is transmitted to the cavity and a resonant noise is caused due to a resonance frequency. In the instant case, the resonant noise is referred to as a resonance noise.

The resonance noise is the largest cause of a vehicle road noise, and the resonance noise is transmitted to an interior of a vehicle to become a cause of degrading ride comfort of a passenger.

To reduce such a resonance noise, there is a technology in which a resonator is mounted on a rim of the wheel for the vehicle or a waveguide is mounted thereon.

In the case of the technology of mounting the resonator on the rim of the wheel, there is a problem in that a variation probability of an attenuation target frequency is high even due to a small deformation of the resonator so that mass productivity is significantly degraded.

In the case of the technology of mounting the waveguide on the rim of the wheel, the mass productivity is improved when compared to the technology of mounting the resonator, but an effect of reducing a resonance noise is insufficient when compared to the technology of mounting the resonator so that to secure the same level of a resonance noise improvement effect as the technology of mounting the resonator, the number of waveguides mounted on the wheel may be increased.

However, due to a structure of the wheel, since the number of waveguides which are mountable on the rim of the wheel is limited to three, when the waveguide is mounted on the rim of the wheel, there is a problem in that resonance noise reduction performance is insufficient when compared to a case in which a resonator is mounted.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a wheel for reducing a resonance noise in a vehicle to increase performance of solving a resonance noise of a wheel without a mass production problem.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

A wheel for reducing a resonance noise in a vehicle for achieving the above objective of the present invention includes the following configurations.

In various exemplary embodiments of the present invention, various aspects of the present invention provide a wheel for reducing a resonance noise in a vehicle, which includes a cylindrical-shaped rim on which a tire is mounted; and waveguides mounted on the rim, disposed in a cavity which is a space between the rim and the tire, having a 'U'-shaped internal passage through which a sound wave generated in the cavity enters, and configured to reflect the sound wave entering the internal passage to generate a sound wave having an inverse phase, wherein a center portion of the internal passage extends in an axial direction of the rim, and first and second end portions of the internal passage are connected to a center portion of the internal passage to allow the sound wave to propagate and extend in a circumferential direction of the rim.

According to various exemplary embodiments of the present invention, each of the waveguides may include seating plates disposed on an external circumferential surface of the rim in a surface-contact state, a 'U'-shaped waveguide main body provided on the seating plates to form the internal passage between the seating plate and the waveguide main body, an entrance provided on a first end portion of the waveguide main body based on a propagation direction of the sound wave in the internal passage to open a first end portion of the internal passage, and a wall provided on a second end portion of the waveguide main body to close a second end portion of the internal passage and reflect a sound wave entering the internal passage through the entrance to return the reflected sound wave to the entrance.

Furthermore, the waveguides may be coupled in a structure in which end portions of the seating plates are engaged with each other to be disposed in the circumferential direction of the rim. For the coupling of the waveguides, a hook may be provided in a first end portion of the seating plates and an engagement hole may be provided in a second end portion of the seating plates based on the circumferential direction of the rim.

Furthermore, at least one of the waveguides mounted on the rim may be provided with a stopper protruding from an edge portion of the seating plate thereof, and the stopper may be inserted into a fixing groove provided in the rim. Furthermore, the rim may be provided with a waveguide mounting portion in which the waveguides are inserted and mounted, and the fixing groove may be provided on a side wall of the waveguide mounting portion.

Furthermore, the seating plate may be pressed against and fixed to the waveguide mounting portion by a strap configured to press the seating plate toward the waveguide mounting portion.

Furthermore, the waveguides may be provided with internal passages having a same length.

Furthermore, a length of the internal passage provided in each of the waveguides may be ¼ times a wavelength of a resonance frequency of the cavity.

Furthermore, the entrances of the waveguides may be disposed to be spaced at 90° intervals in the circumferential direction of the rim.

Meanwhile, according to various exemplary embodiments of the present invention, the waveguides are dualized based on a length of the internal passage. Two waveguides among the waveguides may each be provided with an internal passage having a length different from a length of an internal passage provided in each of remaining two waveguides.

Other aspects and embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
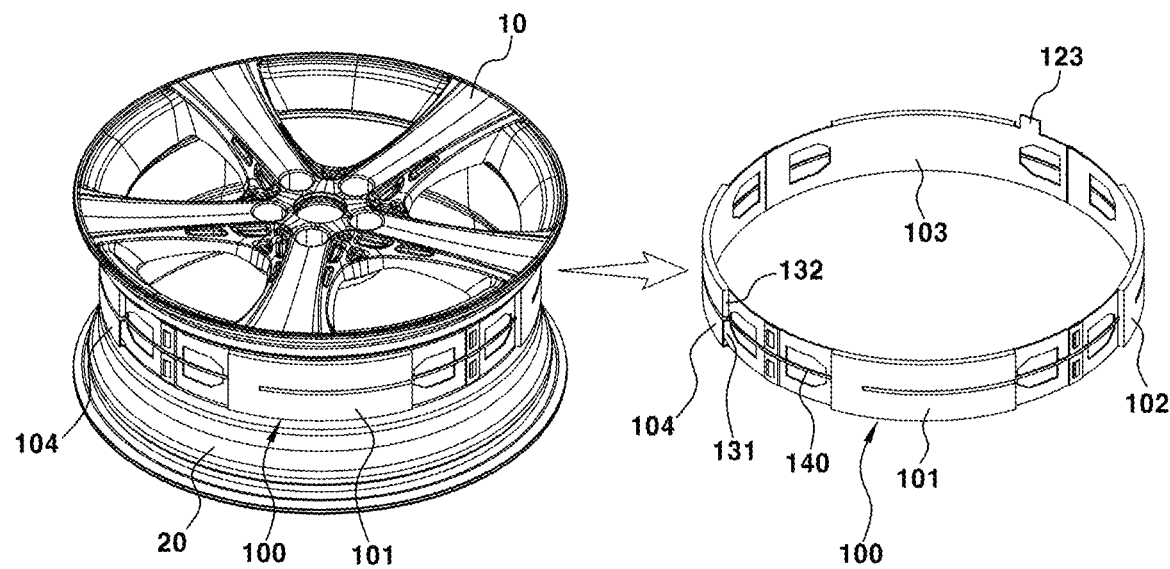
FIG. 1 is a diagram illustrating a wheel for reducing a resonance noise in a vehicle according to various exemplary embodiments of the present invention.

It should be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. Items shown in the drawings are schematically illustrated to easily describe the exemplary embodiments of the present invention, and thus the items may be different from those actually implemented.

Throughout the exemplary embodiment, when an element is referred to as "comprising" a component, it means that the component can further include other components, not excluding the other components unless specifically stated otherwise.

Furthermore, in the exemplary embodiment, known techniques or repetitive descriptions which may obscure the gist of the present invention may be reduced or omitted.

A wheel for reducing a resonance noise according to various exemplary embodiments of the present invention is to increase an effect of reducing a resonance noise using a waveguide of a new structure.

The waveguide may be formed to generate an offset noise for reducing a resonance noise, which is a resonant noise generated in a cavity of the wheel, and the waveguide is also referred to as a wave resonator. The cavity is a space between a rim of the wheel and a tire coupled to the rim.

The cavity has an inherent resonance frequency which is determined according to a circumferential length thereof, and the circumferential length of the cavity is determined based on a radial center portion between the rim and the tire. A resonance frequency $f_0$ may be determined by the following Equation 1.

$$f_0 = c/L_c \qquad \text{[Equation 1]}$$

Here, c is a propagation speed of the sound wave, and $L_c$ is the circumferential length of the cavity.

For noise attenuation, the existing flat-shaped waveguide is formed to have a length which is ¼ times a target frequency wavelength to be attenuated. The waveguide reduces a noise by generating an inverse-phase sound wave with respect to a sound wave of the noise entering an interior of the waveguide.

To reduce a noise generated in the cavity, the existing waveguide is formed to have a length which is ¼ times the resonance frequency wavelength of the cavity, and thus the number of waveguides, which are mountable on the rim of the wheel, and a mounting interval of the waveguides are inevitably limited.

When the existing waveguide is applied, three waveguides at maximum are mounted on the rim of the wheel. When three waveguides are mounted on the rim, the three waveguides are mounted on the rim at intervals of 120°.

The wheel of reducing a resonance noise according to various exemplary embodiments of the present invention utilizes a waveguide of a new structure to increase a resonance noise reduction effect to a level which is higher than or equal to a level of a resonance noise reduction effect of a wheel provided with the existing resonator.

Figure 2:
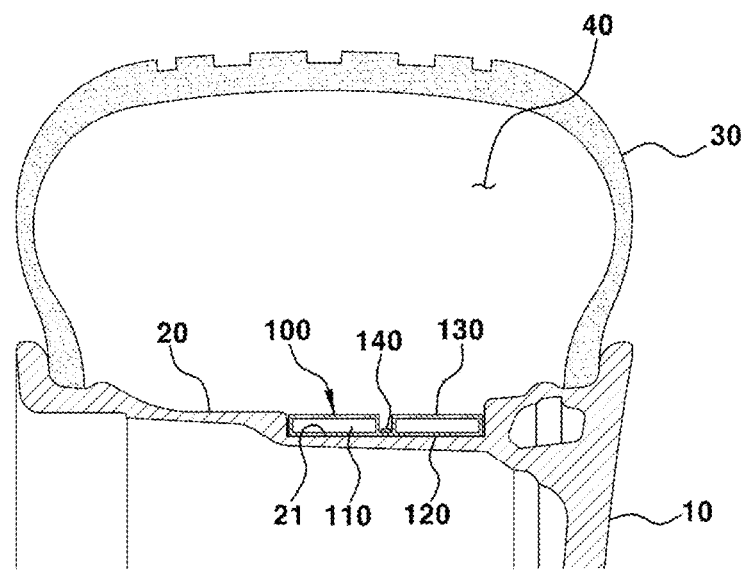
FIG. 2 is a diagram illustrating a state in which a tire is coupled to a wheel for reducing a resonance noise according to various exemplary embodiments of the present invention.
Figure 3:
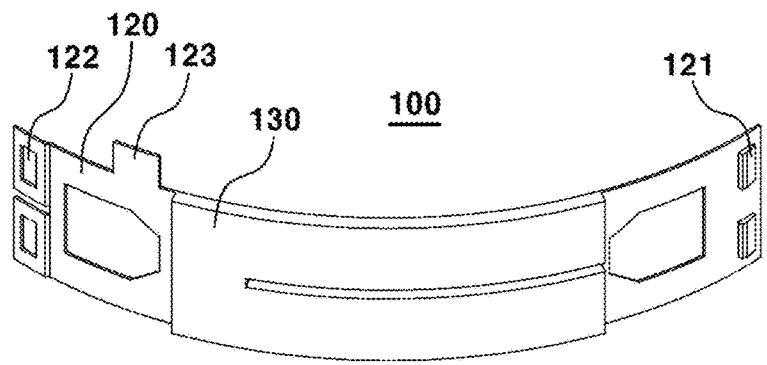
FIG. 3 is a diagram illustrating a waveguide according to various exemplary embodiments of the present invention.
Figure 4:
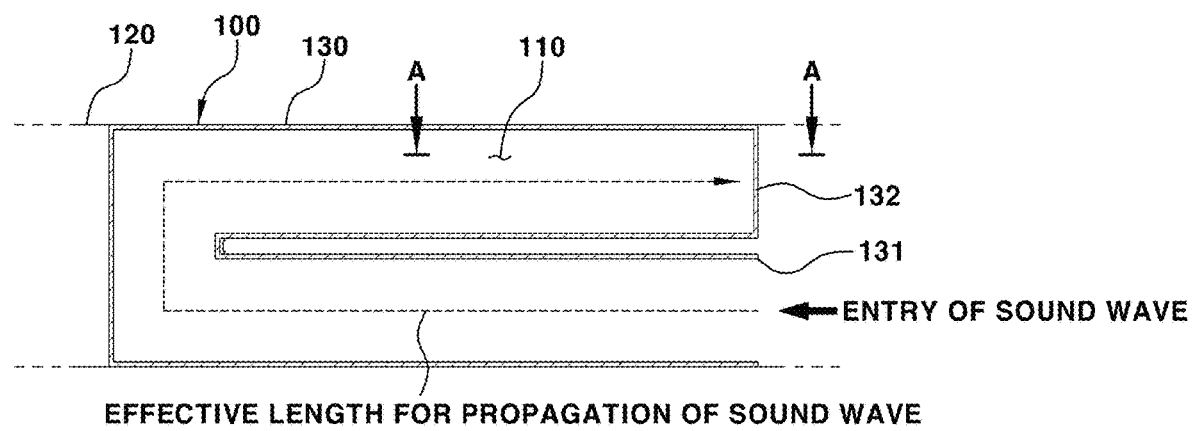
FIG. 4 is a diagram illustrating an effective length for movement of a sound wave in the waveguide according to the exemplary embodiment of the present invention.
Figure 5:
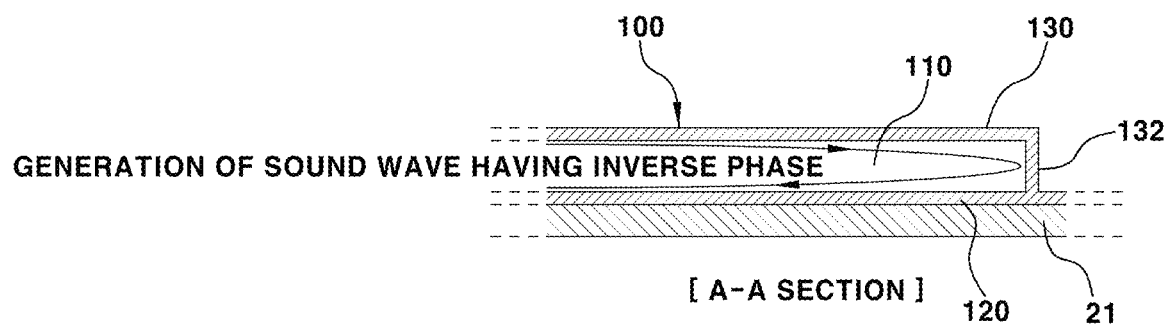
FIG. 5 is a diagram illustrating a principle of canceling a sound wave entering the waveguide according to the exemplary embodiment of the present invention.
Figure 6:
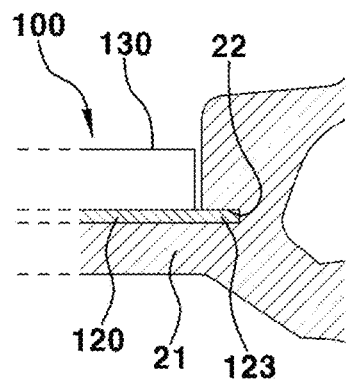
FIG. 6 is a partial diagram illustrating a mounting structure of the waveguide according to the exemplary embodiment of the present invention.
Figure 7:
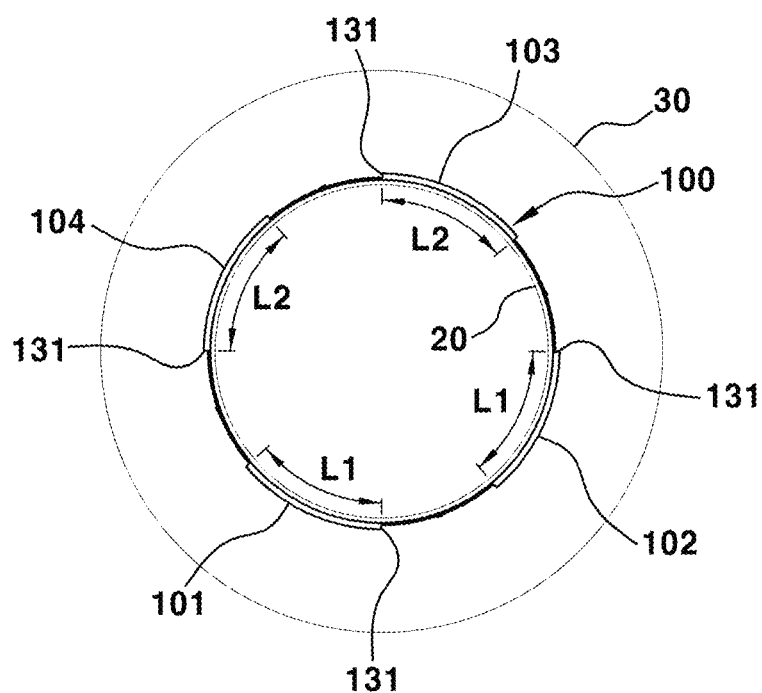
FIG. 7 is a diagram for describing a mounting interval of a waveguide according to the exemplary embodiment of the present invention.

FIG. 1 is a diagram illustrating a wheel for reducing a resonance noise in a vehicle according to various exemplary embodiments of the present invention, FIG. 2 is a diagram illustrating a state in which a tire is coupled to a wheel for reducing a resonance noise according to various exemplary embodiments of the present invention, FIG. 3 is a diagram illustrating a waveguide according to various exemplary embodiments of the present invention, FIG. 4 is a diagram illustrating an effective length for movement of a sound wave in the waveguide according to the exemplary embodiment of the present invention, FIG. 5 is a diagram illustrating a principle of canceling a sound wave entering the waveguide according to the exemplary embodiment of the present invention, FIG. 6 is a partial diagram illustrating a mounting structure of the waveguide according to the exemplary embodiment of the present invention, and FIG. 7 is a diagram for describing a mounting interval of a waveguide according to the exemplary embodiment of the present invention.

As shown in FIG. 1 and FIG. 2, the wheel for reducing a resonance noise according to the exemplary embodiment of the present invention includes a spoke 10, a rim 20 provided on an edge portion of the spoke 10, and a plurality of waveguides 100 mounted on the rim 20.

The spoke 10 may be formed of supports radially extending from an axle toward the rim 20.

The rim 20 is a cylindrical portion forming a circumference of the wheel, and a tire 30 in contact with a road surface is mounted on the rim 20.

The rim 20 includes a waveguide mounting portion 21 on which the waveguides 100 are mounted, and the waveguide mounting portion 21 is formed to seamlessly extend in a circumferential direction of the rim 20.

The waveguide mounting portion 21 may be formed in a form of being depressed by as much as a predetermined depth in a radial direction of the rim 20, and the waveguides 100 may be inserted and accommodated in the waveguide mounting portion 21.

As shown in FIG. 2, FIG. 3 and FIG. 4, the waveguide 100 is mounted on the rim 20 and disposed in a cavity 40 which is a space between the rim 20 and the tire 30 and has a 'U'-shaped internal passage 110 into which a sound wave generated in the cavity 40 is introduced.

A center portion of the internal passage 110 is a section in which a propagation direction of the sound wave entering the internal passage 110 is switched. The center portion of the internal passage 110 extends in an axial direction of the rim 20, and both end portions of the internal passage 110 are connected to the center portion of the internal passage 110 to allow the sound wave to propagate and extend in the circumferential direction of the rim 20.

Since the waveguide 100 includes the 'U'-shaped internal passage 110, an effective length in the waveguide 100 for propagation of a sound wave may maintain a length to reduce the resonant noise of the cavity 40, and simultaneously, an external length of the waveguide 100 based on the circumferential direction of the rim 20 may be reduced to a level of ½ of the internal passage 110.

Thus, when compared with the related art, in the wheel according to various exemplary embodiments of the present invention, a larger number of waveguides 100 may be mounted on the rim 20 so that an effect of reducing a resonance noise in the cavity 40 may be increased.

Here, since a target frequency to be attenuated by the waveguide 100 is a resonance frequency of the cavity 40, a length of the internal passage 110 provided in each waveguide 100 is determined to be ¼ times a wavelength length of the resonance frequency of the cavity 40, and the resonance frequency of the cavity 40 is determined according to a circumferential length of the cavity 40.

In various exemplary embodiments of the present invention, the waveguides 100 may have the internal passages 110 having the same length to attenuate a noise of the same resonance frequency.

Referring to FIG. 5, the waveguide 100 reflects the sound wave entering the internal passage 110 to generate an inverse phase sound wave. When a sound wave of a resonance frequency entering the internal passage 110 is referred to as a first sound wave, the waveguide 100 may reflect the first sound wave to generate a second sound wave which is a sound wave having an inverse phase with respect to the first sound wave. The second sound wave may cancel the first sound wave having the resonance frequency.

The waveguide 100 is formed in a structure for canceling the first sound wave by generating the second sound wave with respect to the first sound wave. In other words, to cancel the sound wave having the resonance frequency entering the internal passage 110, the waveguide 100 is formed in a structure for generating a sound wave having an inverse phase with respect to the sound wave having the resonance frequency.

Referring to FIG. 2, FIG. 3, FIG. 4 and FIG. 5, the waveguide 100 includes a seating plate 120 and a waveguide main body 130 integrally formed with the seating plate 120.

The seating plate 120 is formed in a plate shape which may be disposed on an external circumferential surface of the rim 20 in a surface-contact state and when mounted on the rim 20, the seating plate 120 is disposed in the waveguide mounting portion 21 of the rim 20 in a surface-contact state.

The waveguide main body 130 is formed in a U shape in which a center portion thereof in the longitudinal direction is curved, and the waveguide main body 130 is provided on the seating plate 120 to form the internal passage 110 between the waveguide main body 130 and the seating plate 120. The waveguide main body 130 may have a U-shaped cross-sectional structure and may be formed on the seating plate 120, and the internal passage 110, which is a space for the propagation of the sound wave, is provided between the waveguide main body 130 and the seating plate 120. The waveguide main body 130 is disposed in a center portion of the seating plate 120 in a longitudinal direction thereof, and the waveguide main body 130 is provided in a form of protruding from one side of the seating plate 120.

Furthermore, an entrance 131 for opening a first end portion of the internal passage 110 is provided at a first end portion of the waveguide main body 130, and a wall 132 for closing a second end portion of the internal passage 110 is provided at a second end portion of the waveguide main body 130. The first end portion and the second end portion are end portions based on a propagation direction of a sound wave in the internal passage 110, and the first end portion and the second end portion are disposed opposite to each other based on the propagation direction of the sound wave in the internal passage 110.

Referring to FIG. 1, the entrance 131 and the wall 132 may be disposed at the same position based on the circumferential direction of the rim 20, and the entrance 131 and the wall 132 may be spaced from each other based on the axial direction of the rim 20.

The entrance 131 allows a sound wave to enter the internal passage 110 or exit the internal passage 110, and the wall 132 reflects the sound wave entering the internal passage 110 through the entrance 131 to return to the entrance 131.

The sound wave entering the internal passage 110 through the entrance 131 propagates along the internal passage 110 to reach the wall 132 and hits the wall 132 to be reflected back to the entrance 131.

Here, assuming that the sound wave of the resonance frequency entering the internal passage 110 is the first sound wave, and a sound wave which is generated when the first sound wave hits the wall 132 is the second sound wave, the second sound wave is a sound wave having an inverse phase with respect to the first sound wave.

The waveguide 100 may cancel the first sound wave entering the internal passage 110 by generating the second sound wave through the wall 132 so that a resonance noise generated in the cavity 40 may be reduced.

Meanwhile, when the waveguides 100 are disposed in the waveguide mounting portion 21 of the rim 20, end portions of the seating plates 120 are coupled to each other in an interlocked structure and are disposed in the circumferential direction of the rim 20. To the present end, a hook 121 is provided in a first end portion of the seating plate 120, and an engagement hole 122, to which a hook of another seating plate adjacent to the seating plate 120 is hooked and engaged, is provided in a second end portion of the seating plate 120. In the instant case, the first end portion and the second end portion of the seating plate 120 are end portions based on the circumferential direction of the rim 20 and are disposed opposite to each other based on the waveguide main body 130.

As in the example of FIG. 1, when four waveguides 100 in total are mounted on the rim 20, the four waveguides 100 may be divided into a first waveguide 101, a second waveguide 102, a third waveguide 103, and a fourth waveguide 104 according to an order of being disposed in the circumferential direction of the rim 20.

A hook of the first waveguide 101 may be hooked to and engaged with an engagement hole of the second waveguide 102 adjacent to the first waveguide 101, and an engagement hole of the first waveguide 101 may be hooked to and engaged with a hook of the fourth waveguide 104 adjacent to the first waveguide 101. Similarly, a hook of the third waveguide 103 may be hooked to and engaged with an engagement hole of the fourth waveguide 104, and an engagement hole of the third waveguide 103 may be hooked to and engaged with a hook of the second waveguide 102.

The waveguides 100 are completely coupled through ultrasonic fusing in a state of being incompletely mounted on the waveguide mounting portion 21 of the rim 20 through the engagement between the hook 121 and the engagement hole 122.

Furthermore, to prevent the waveguide 100 from slipping on the rim 20 when the wheel is rotated, as shown in FIG. 6, at least one waveguide of the waveguides 100 mounted on the rim 20 includes a stopper 123 inserted into a fixing groove 22 of the rim 20.

The stopper 123 is formed to protrude from an edge portion of the seating plate 120, and the fixing groove 22 is provided on a side wall of the waveguide mounting portion 21. When the seating plate 120 of the waveguide 100 is disposed on a bottom surface of the waveguide mounting portion 21, the stopper 123 may be inserted into the fixing groove 22.

The waveguide 100 may be manufactured by a plastic blow method with high moldability.

Furthermore, to further increase a coupling force with respect to the waveguide mounting portion 21, the waveguide 100 may be fixed to and pressed against the waveguide mounting portion 21 using a strap 140 made of a steel material.

The strap 140 may be made of a steel material having high strength and may press the seating plate 120 of the waveguide 100 toward the waveguide mounting portion 21, fixing the seating plate 120 in a state of being pressed against the waveguide mounting portion 21.

The strap 140 is mounted to the waveguide 100 using a tool. The strap 140 is disposed on the seating plate 120 to pass through a space between the entrance 131 and the wall 132 of the 'U'-shaped waveguide main body 130 and passes through the seating plate 120 not a center portion of the waveguide main body 130 in a longitudinal direction to be disposed below the center portion of the waveguide main body 130 in the longitudinal direction thereof.

When the strap 140 disposed as described above is tightly tightened with a tool, the strap 140 presses the seating plate 120 toward the waveguide mounting portion 21 and thus the seating plate 120 is tightly fixed to and pressed against the waveguide mounting portion 21 so that the waveguide 100 may be prevented from being separated from the waveguide mounting portion 21.

Meanwhile, since an external length of the waveguide main body 130 is about ½ of a length of the internal passage 110, six waveguides 100 may be mounted at maximum in the waveguide mounting portion 21 of the rim 20 by adjusting a length of the seating plate 120.

As the number of the waveguides 100 is increased, an effect of reducing a resonance noise generated in the cavity 40 may be increased. However, it is preferable to mount four waveguides 100 on the rim 20 in consideration of an effect of reducing a resonance noise according to a mounting interval of the waveguide 100. This is because an effect of reducing a resonance noise is the highest when the waveguides 100 are disposed to be spaced at 90° intervals in the circumferential direction of the rim 20.

When four waveguides 100 are mounted on the rim 20 at 90° intervals, it is possible to obtain an effect for reducing a resonance noise at a level which is higher than or equal to a level of an effect for reducing a resonance noise when five or six waveguides 100 are mounted on the rim 20 at intervals less than 90°.

Thus, in the exemplary embodiment of the present invention, four waveguides 100 are disposed to be spaced at 90° intervals in the waveguide mounting portion 21 of the rim 20. In the instant case, as shown in FIG. 7, the entrances 131 of the waveguides 100 are disposed to be spaced at 90° intervals in the circumferential direction of the rim 20.

When four waveguides 100 are mounted in the waveguide mounting portion 21 of the rim 20 at 90° intervals, it is possible to secure an effect of reducing a resonance noise at a level which is higher than or equal to a level of an effect for reducing a resonance noise when six waveguides 100 are mounted in the waveguide mounting portion 21 and it is advantageous for reduction in production cost and weight of the vehicle.

Meanwhile, while driving on a real road, the cavity 40 has two resonance frequencies according to a vehicle speed.

In various exemplary embodiments of the present invention, the internal passages 110 of the waveguides 100 mounted on the rim 20 are dualized so that it is possible to reduce all resonance noises caused due to the two resonance frequencies.

For example, the cavity 40 may have resonance frequencies of 210 Hz and 220 Hz according to the vehicle speed. In the instant case, a waveguide formed to attenuate a resonance noise of 210 Hz and a waveguide formed to attenuate a resonance noise of 220 Hz are mounted on the rim 20 so that both the resonance noises of 210 Hz and 220 Hz may be reduced.

Thus, in the exemplary embodiment of the present invention, among the four waveguides 100 mounted on the rim 20 at 90° intervals, two waveguides may be formed to reduce a noise of a first resonance frequency, and the remaining two waveguides may be formed to reduce a noise of a second resonance frequency. In the instant case, the first resonance frequency and the second resonance frequency are different frequencies.

In other words, in the exemplary embodiment of the present invention, the four waveguides 100 mounted on the rim 20 may be dualized based on the length of the internal passage 110.

For example, among the four waveguides 100 mounted on the rim 20, the first waveguide 101 and the second waveguide 102 may have internal passages with a length L1, formed to reduce the noise of the first resonance frequency, and the third waveguide 103 and the fourth waveguide 104 may have internal passages with a length L2, formed to reduce the noise of the second resonance frequency.

Here, the length of the internal passage 110 means an effective length for propagation of a sound wave entering the internal passage 110. The length of the internal passage 110 may mean a propagation distance until the sound wave entering the internal passage 110 through the entrance 131 reaches the wall 132.

As described above, a case in which the waveguides 100 are dualized based on the length of the internal passage 110 is limited to a case in which the entrances 131 of the waveguides 100 are disposed to be spaced at 90° intervals. This is because the wheel of the present invention secures an effect for reducing a resonance noise which is equal to an effect for reducing a resonance noise of a wheel on which the existing resonator is mounted.

That is, even when the waveguides 100 are dualized, to secure an effect of reducing a resonance noise at a level which is equal to a level of an effect of reducing a resonance noise of the wheel on which the existing resonator is mounted, it is necessary to arrange the waveguides 100 at 90° intervals in the waveguide mounting portion 21.

In other words, in the wheel for a vehicle according to various exemplary embodiments of the present invention, the entrances 131 of the waveguides 100 mounted on the rim 20 are disposed at 90° intervals and the waveguides 100 are dualized based on the length of the internal passage 110 so that it is possible to reduce all resonance noises dualized according to the vehicle speed and reduce the resonance noises to the same level as that of a wheel on which the existing resonator is mounted.

Figure 8:
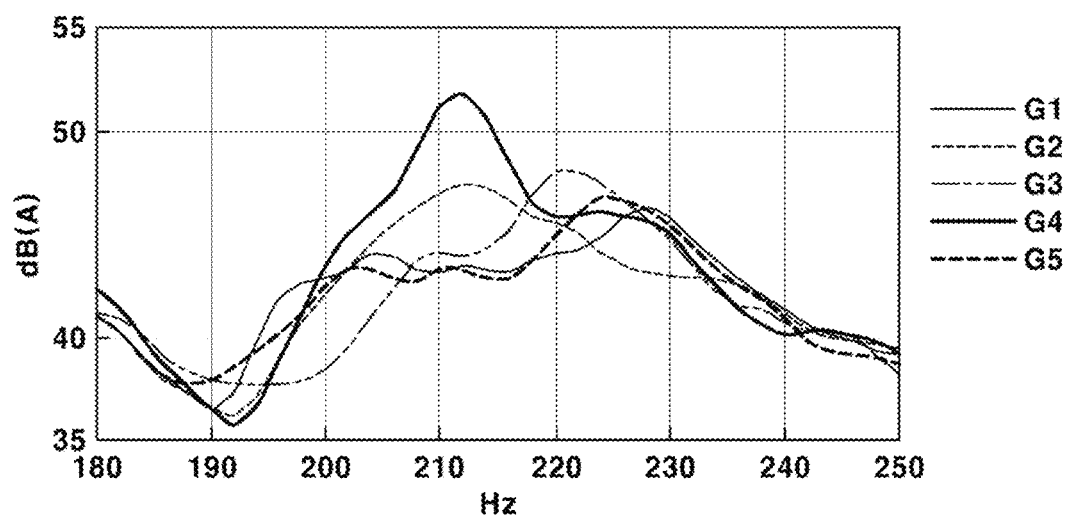
FIG. 8 and FIG. 9 are graphs showing a resonance noise reduction effect of the wheel for a vehicle according to various exemplary embodiments of the present invention when compared with the existing wheel.
Figure 9:
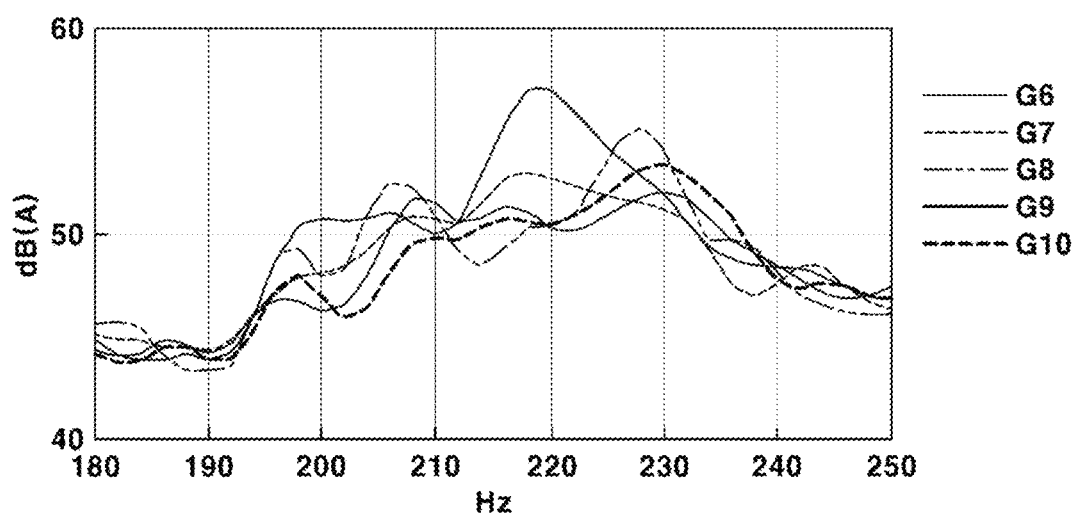

FIG. 8 and FIG. 9 are graphs showing a resonance noise reduction effect of the wheel for a vehicle according to various exemplary embodiments of the present invention when compared with the existing wheel.

In FIG. 8, G1 is a graph showing resonance noise reduction performance of the wheel on which the waveguide according to various exemplary embodiments of the present invention is mounted, G2 is a graph showing resonance noise reduction performance of a wheel on which the existing resonator is mounted, G3 is a graph showing resonance noise reduction performance of a wheel on which the existing waveguide is mounted, G4 is a graph showing resonance noise reduction performance of a wheel on which a resonator or a waveguide is not mounted, and G5 is a graph showing resonance noise reduction performance of a wheel on which a waveguide having an entrance in an opposite direction with respect to the waveguide applied to G1 is mounted.

All of G1 to G5 show the resonance noises measured while driving at 40 kph in an interior of a vehicle to which a wheel having a resonance frequency of 210 Hz of a cavity is applied.

Referring to FIG. 8, it can be confirmed that G1 has the highest resonance noise reduction performance among G1 to G5 at the resonance frequency of 210 Hz.

Furthermore, in FIG. 9, G6 is a graph showing resonance noise reduction performance of the wheel on which the waveguide according to various exemplary embodiments of the present invention is mounted, G7 is a graph showing resonance noise reduction performance of a wheel on which the existing resonator is mounted, G8 is a graph showing resonance noise reduction performance of a wheel on which the existing waveguide is mounted, G9 is a graph showing resonance noise reduction performance of a wheel on which a resonator or a waveguide is not mounted, and G10 is a graph showing resonance noise reduction performance of a wheel on which a waveguide having an entrance in an opposite direction with respect to the waveguide applied to G6 is mounted.

All of G6 to G10 show the resonance noises measured while driving at 80 kph in the interior of the vehicle to which the wheel having the resonance frequency of 220 Hz of the cavity is applied.

Referring to FIG. 9, it may be confirmed that G6 has the highest resonance noise reduction performance among G6 to G10 at the resonance frequency of 220 Hz.

Thus, in the case of the wheel on which the waveguide according to various exemplary embodiments of the present invention is mounted, it may be seen that an effect of reducing a resonance noise is increased when compared to a wheel on which the existing resonator is mounted or a wheel on which the existing waveguide is mounted.

Meanwhile, both of G1 and G5 are graphs showing the resonance noise reduction performance of the wheel on which the waveguide according to various exemplary embodiments of the present invention is mounted, and G1 and G5 differ only in an arrangement of the entrance of the waveguide. Furthermore, both of G6 and G10 are graphs showing the resonance noise reduction performance of the wheel on which the waveguide according to various exemplary embodiments of the present invention is mounted, and G6 and G10 differ only in an arrangement of the entrance of the waveguide.

G1 and G6 show an effect of reducing a resonance noise of the wheel on which a waveguide, which a sound wave enters in a direction opposite to a rotation direction of the wheel according to an arrangement of the entrance of the waveguide, is mounted, and G5 and G10 show an effect of reducing a resonance noise of the wheel on which a waveguide, which a sound wave enters in the rotation direction of the wheel according to the arrangement of the entrance of the waveguide, is mounted.

Referring to FIG. 8 and FIG. 9, it may be confirmed that an effect of reducing a resonance noise of the wheel on which the waveguide, which a sound wave enters in a direction opposite to a rotation direction of the wheel, is mounted is somewhat higher than an effect of reducing a resonance noise of the wheel on which a waveguide, which a sound wave enters in the rotation direction of the wheel, is mounted.

In accordance with various aspects of the present invention, a waveguide of a new structure is applied so that resonance noise reduction performance of a wheel may be effectively increased, and the wheel on which the waveguide according to various exemplary embodiments of the present invention is mounted can secure the resonance noise reduction performance which is greater than or equal to resonance noise reduction performance of a wheel on which the existing resonator is mounted.

Furthermore in accordance, in accordance with various aspects of the present invention, a target attenuation frequency of the waveguide may be dualized based on a length of an internal passage of the waveguide so that all resonance noises dualized according to a vehicle speed may be attenuated.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A wheel for reducing a resonance noise in a vehicle, the wheel comprising:
    a cylindrical-shaped rim on which a tire is mounted; and
    waveguides mounted on the rim, disposed in a cavity which is a space between the rim and the tire, having a 'U'-shaped internal passage through which a sound wave generated in the cavity enters, and configured to reflect the sound wave entering the internal passage to generate a sound wave having an inverse phase,
    wherein a center portion of the internal passage extends in an axial direction of the rim, and both end portions of the internal passage are connected to the center portion of the internal passage to allow the sound wave to propagate and extend in a circumferential direction of the rim.

2. The wheel of claim 1, wherein the waveguides include:
    seating plates disposed on an external circumferential surface of the rim in a surface-contact state;
    a 'U'-shaped waveguide main body provided on the seating plates to form the internal passage between the seating plate and the waveguide main body;
    an entrance provided on a first end portion of the waveguide main body based on a propagation direction of the sound wave in the internal passage to open a first end portion of the internal passage; and
    a wall provided on a second end portion of the waveguide main body to close a second end portion of the internal passage and reflect a sound wave entering the internal passage through the entrance to return the reflected sound wave to the entrance.

3. The wheel of claim 2, wherein the waveguides are coupled in a structure in which end portions of the seating plates are engaged with each other to be disposed in the circumferential direction of the rim.

4. The wheel of claim 3, wherein a hook is provided in a first end portion of the seating plates and an engagement hole is provided in a second end portion of the seating plates based on the circumferential direction of the rim.

5. The wheel of claim 2,
    wherein at least one of the waveguides mounted on the rim is provided with a stopper protruding from an edge portion of the seating plates thereof; and
    wherein the stopper is inserted into a fixing groove provided in the rim.

6. The wheel of claim 5,
    wherein the rim is provided with a waveguide mounting portion in which the waveguides are inserted and mounted; and
    wherein the fixing groove is provided on a side wall of the waveguide mounting portion.

7. The wheel of claim 6, wherein the seating plates is pressed against and fixed to the waveguide mounting portion by a strap configured to press the seating plates toward the waveguide mounting portion.

8. The wheel of claim 1, wherein the waveguides are provided with internal passages having a same length.

9. The wheel of claim 1, wherein a length of the internal passage provided in each of the waveguides is ¼ times a wavelength of a resonance frequency of the cavity.

10. The wheel of claim 2, wherein the entrances of the waveguides are disposed to be spaced at 90° intervals in the circumferential direction of the rim.

11. The wheel of claim 10, wherein the waveguides are formed with a first waveguide and a second waveguide, and the first waveguide is provided with an internal passage having a length different from a length of an internal passage provided in the second waveguide.

12. The wheel of claim 11, wherein the first waveguide and the second waveguide are each provided with two waveguides, and the two waveguides of the first waveguide are each provided with an internal passage having a length different from a length of an internal passage provided in each of the two waveguides of the second waveguide.

* * * * *